United States Patent [19]
Valette et al.

[11] Patent Number: 5,818,623
[45] Date of Patent: Oct. 6, 1998

[54] SCANNING MICRO-ELEMENTS FOR OPTICAL SYSTEMS

[75] Inventors: Serge Valette, Grenoble; Yves Fouillet, Voreppe, both of France

[73] Assignee: Commissariat a L'Energie Atomique, Paris, France

[21] Appl. No.: 679,754

[22] Filed: Jul. 10, 1996

[30] Foreign Application Priority Data

Jul. 19, 1995 [FR] France .................................. 95 08751

[51] Int. Cl.⁶ .................................................. G02B 26/08
[52] U.S. Cl. ........................ 359/224; 359/201; 359/223; 359/230
[58] Field of Search .................................. 359/201, 223, 359/224, 230, 290, 291, 847, 871; 310/328, 335

[56] References Cited

U.S. PATENT DOCUMENTS

5,281,887  1/1994  Engle .
5,625,483  4/1997  Swartz ..................................... 359/224

FOREIGN PATENT DOCUMENTS

0 614 101  9/1994  European Pat. Off. .

OTHER PUBLICATIONS

IBM Technical Disclosure Bulletin, vol. 20, No. 1, pp. 355–356, Jun. 1977, "Micromechanical Light Deflector Array".

IBM Technical Disclosure Bulletin, vol. 22, No. 12, pp. 5575–5577, May 1980, "Color Projection Display System Using Silicon Micromechanics".

SPIE Miniature and Micro–Optics and Micromechanics, vol. 1992, pp. 32–39, 1993, Hiroshi Goto, "High Performance Micro Photonic Devices with Micro Atuator".

Solid State Technology, pp. 63–68, Jul. 1994, Michael A. Mignardi, "Digital Micromirror Array for Projection TV".

*Primary Examiner*—James Phan
*Attorney, Agent, or Firm*—Oblon, Spivak, McClelland, Maier & Neustadt, P.C.

[57] ABSTRACT

This invention relates to a scanning micro-element for an optical system, characterized in that it comprises:

a substrate (12), a membrane (14, 16) made of a dielectric material deposited on a substrate surface, the membrane defining two planes making a non-zero angle α between them, part (14) of the membrane including a reflecting area (20) capable of being deflected along at least a first direction above a cavity formed in the substrate, means (22, 24, 26, 28) to deflect this part of the membrane along at least one direction.

62 Claims, 8 Drawing Sheets

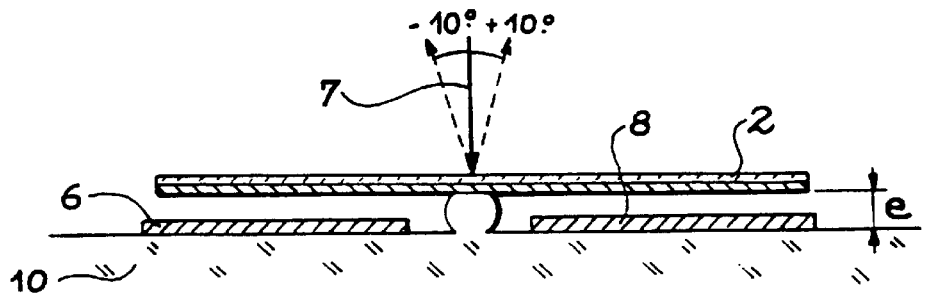
PRIOR ART FIG. 1
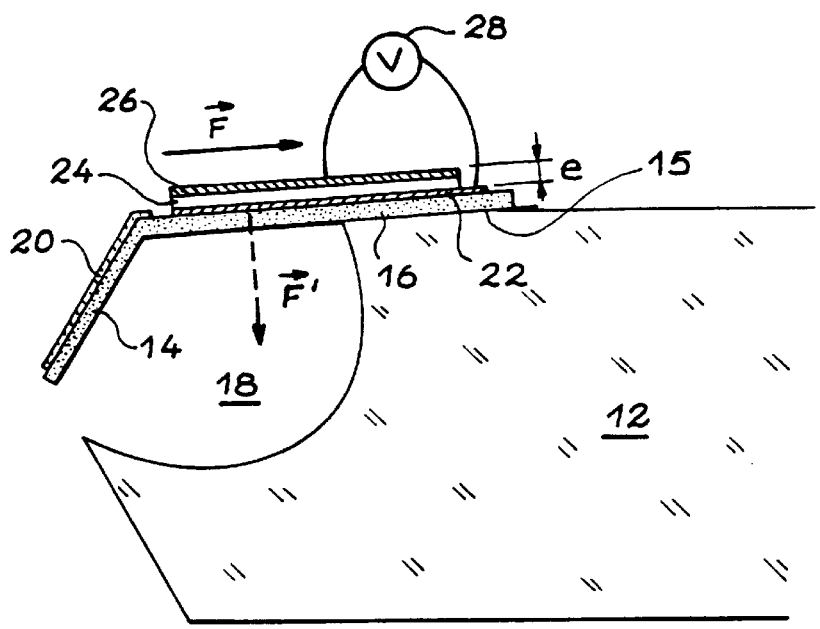
FIG. 2
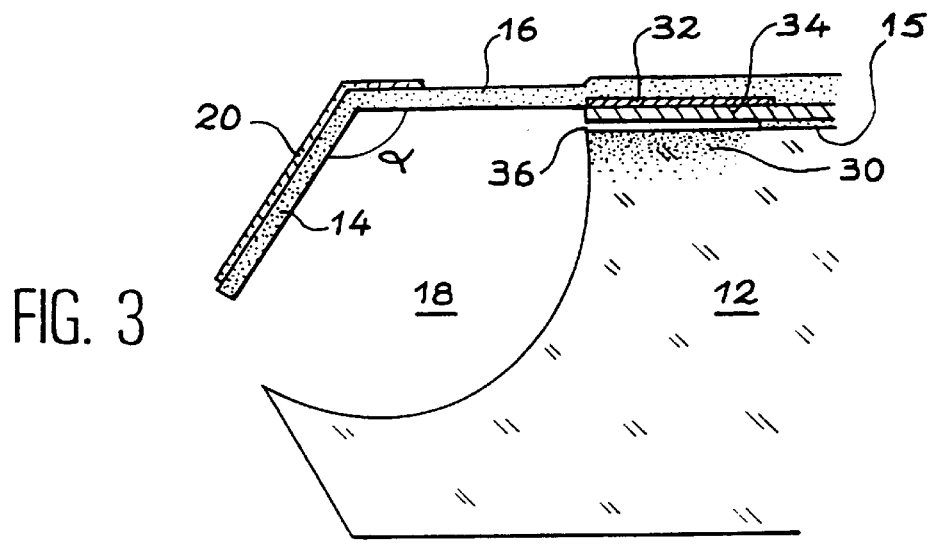
FIG. 3

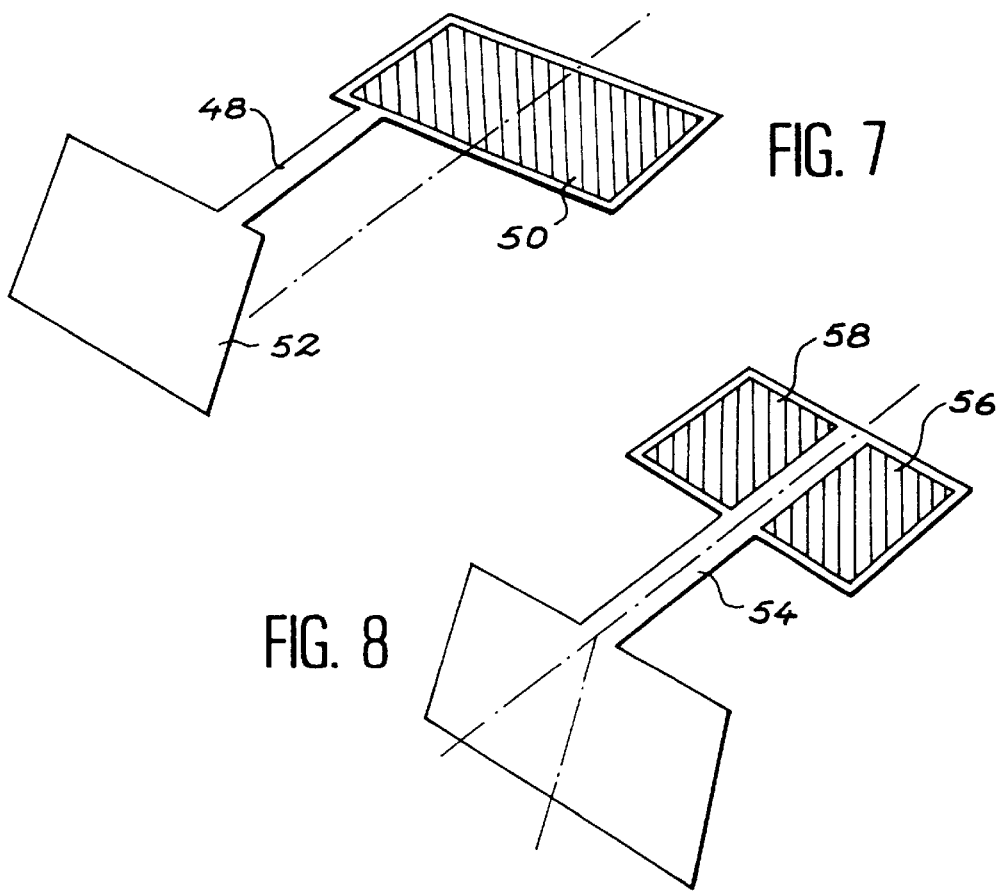
FIG. 7
FIG. 8
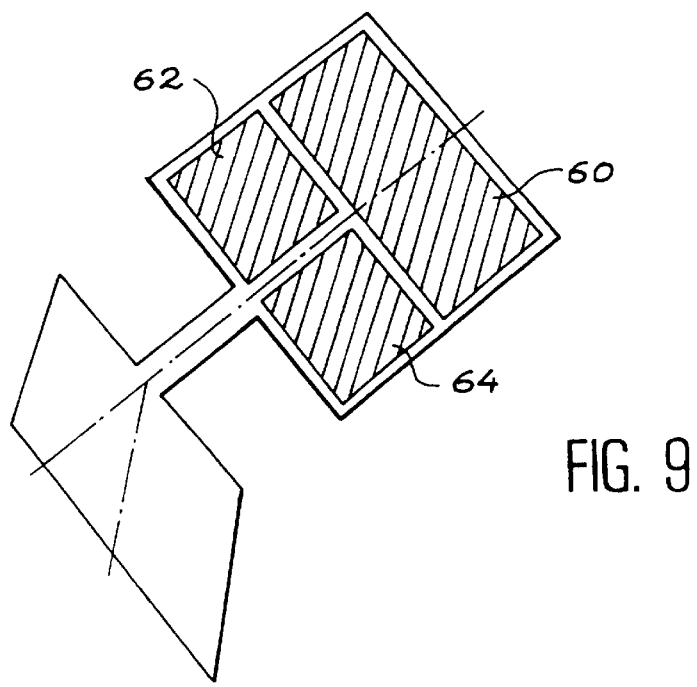
FIG. 9

SCANNING MICRO-ELEMENTS FOR OPTICAL SYSTEMS

DISCUSSION OF THE BACKGROUND

1. Technical Field

This invention relates to the field of scanning micro-elements for optical systems, particularly rotatable micro-mirrors for an optomechanical system and their manufacturing procedures.

This type of component is used in miniaturized optical systems, for which there is a need in many applications particularly in the automobile and medical fields, and in the industrial control field. One of the key elements of these microsystems is the light beam scanning element, which is particularly difficult to manufacture whenever the required angles of deflection exceed a few degrees.

2. State of the Art

A first known device is described in an article by M. A. Mignardi entitled "Digital micromirror array for projection TV", which was published in Solid State Technology, pages 63–68, July 1994. This device is shown schematically in FIG. 1 and comprises a micromirror 2 which has an upper reflecting surface and which also acts as an upper electrode with respect to two lower electrodes 6, 8 deposited on a substrate 10. By varying the voltages applied between the different electrodes, it is possible to make the mirror 2 deflect around a torsion beam 4. This deviates an incident beam 7 by an angle α between about +10° and −10°. With this type of device, the technological manufacturing constraints and the need to achieve the best possible compromise between the electrode control voltages and a high value of the deflection angle lead to more complex layouts, for instance as described in the article by T. Usuda, entitled "Mechanical sensors: a novel silicon torsional resonator with two degrees of freedom" published in the $7^{th}$ Int. Conf. on Solid State Sensors and actuators, pages 10 and 11, 19. In the diagram shown in FIG. 1, the distance between electrodes e must be minimized in order to minimize control voltages, which is contradictory to a large deflection amplitude. Therefore, more complex existing layouts use different means (geometric shape, double torsion axis, etc.) in an attempt to separate the control area and the mirror reflection area. All these devices operate on the same principles; they reflect the beam into the half-space from which the incident beam originates.

Another device is described in an article by H. Goto, entitled "High performance microphonic devices with microactuactor", published in SPIE, Miniature and Micro-Optics and Micromechanics, pages 32 to 39, 1993. In this case, a mirror structure with a precisely calculated geometric shape is glued onto a piezoelectric element. The unidirectional vibration of the ceramic excites the natural frequencies of the resonator formed by the mirror and introduces a resonant oscillation along two directions when the piezoelectric element control frequencies correspond to the resonator frequencies. This system is attractive since it enables scanning with two degrees of freedom, but it does not really use micro-technologies and it is not compatible with a collective manufacturing method.

SUMMARY OF THE INVENTION

The first object of the invention is to provide a new type of scanning micro-element for an optical system compatible with collective manufacturing techniques.

More precisely, the object of the invention is a scanning micro-element for an optical system characterized in that it comprises:

a substrate a membrane made of a dielectric material deposited on a substrate surface, the membrane defining two planes making a non-zero angle α between them, part of the membrane including a reflecting area and capable of being deflected along at least a first direction above a cavity formed in the substrate, means to deflect this part of the membrane along at least one direction.

This element is fully compatible with collective manufacturing techniques known in the microelectronics field.

Furthermore, the part of the membrane located above the cavity can be deflected along at least one second direction above the cavity.

The amplitude along one of the deflection directions may then exceed the amplitude along one of the other deflection directions.

The part of the membrane that can be deflected may be connected by a microbeam to a fixed part that carries means to force a deflection on the mobile part.

The fixed part then has an axis of symmetry, with which the microbeam is parallel. The microbeam may be offset from this axis. The mobile part of the membrane may be offset laterally from the axis of symmetry of the fixed part. Furthermore, means provided to deflect the mobile part may include several groups of means distributed on each side of the axis of symmetry.

The deflection means may be piezoelectric or electrostatic.

Furthermore, the part of the membrane that may be deflected may be oriented along a crystallographic plane of the substrate.

The cavity may be located at the edge of a surface opening formed in the substrate, this surface opening possibly being a through opening crossing the entire thickness of the substrate.

A micro-optical device may furthermore include a micro-element like that described above, together with a second reflecting zone laid out on the substrate so as to reflect a light beam, referred to as the incoming beam, originating from a certain direction, towards the reflecting area of the membrane, the beam then being subjected to two successive reflections to subsequently form an outgoing beam.

The second reflecting area is located on the substrate; it may be formed directly on the substrate, or it may be added onto it.

This second reflecting area may be formed by or on a wall of a surface opening or a through opening formed in the substrate. This surface may also be oriented along a crystallographic plane in the substrate.

According to a specific embodiment, a micro-optical device according to the invention can be used to solve the problem of assembling entire plates of components. Apart from the collective manufacture of components used in a micro-system, it is desirable that assembly can also be done for entire plates, rather than only for individual elements, particularly for cost reasons. Furthermore, it is important that the architecture of the various components to be assembled allows stacking as simply as possible. To enable this type of stacking with micro-scanning elements or micro-optical devices including this type of element, it is desirable that the light beam is deflected towards the front of the device and not towards the back, in other words the angle defined between an incoming beam into the device and an outgoing beam from the device should be greater than 90°.

In order to solve this problem, a micro-optical device such as that described above may also be characterized such that the second reflecting area is placed so that the angle between the incoming beam and the outgoing beam exceeds 90°.

The two reflecting areas may define two approximately parallel planes when the membrane is in the at-rest position. These two planes may be parallel to a given crystallographic plane in the substrate.

BRIEF DESCRIPTION OF THE DRAWINGS

FIG. 1 shows a device according to the prior art,

FIGS. 2 and 3 are embodiments of the invention,

FIGS. 4 to 10 show various forms of vibrating membrane,

DETAILED DESCRIPTION OF EMBODIMENTS

Figure 4:
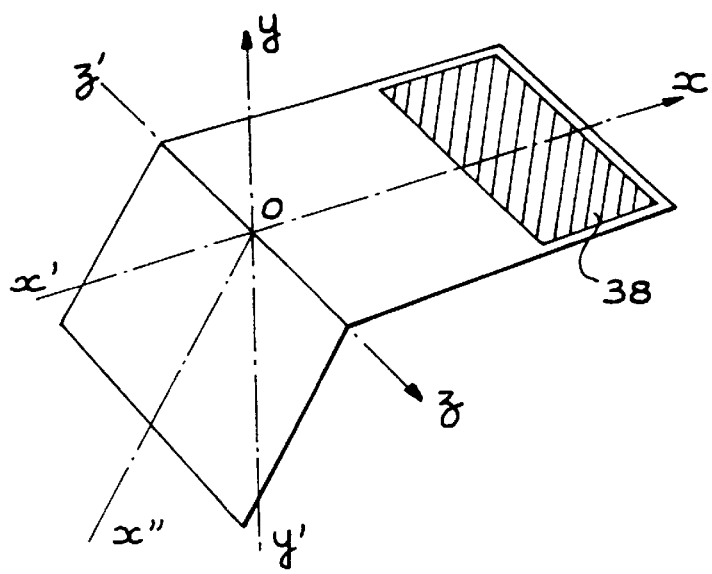

FIG. 2 is a first example of an embodiment of the device according to the invention. On this figure, reference 12 refers to a substrate, an insulating material or a semiconductor, for example a silicon substrate. A cavity 18 has been formed in this substrate. A prior deposit of a membrane 14, 16 made of dielectric material was formed on the substrate surface 15 before the material occupying this cavity was removed. Opening up the cavity 18 released part of the membrane, particularly part 14. This part is preferably treated, for example by a coating 20, so as to form a reflecting area (also called mirror in the rest of this description) for a given range of wavelengths. The end 14 of the membrane on which at least part of the reflecting area is located, is mobile. It may be deflected, for example along a direction approximately perpendicular to its plane, as shown on FIG. 2 (elongation movement). These deflections may be induced by piezoelectric or electrostatic deflection means. FIG. 2 shows piezoelectric means comprising a lower electrode 22 placed above membrane 16, a layer 24 of a piezoelectric material and an upper electrode 26. Means 28 are also provided to set up the required voltage between electrodes 26 and 22. The layer of piezoelectric material may be made of ZnO, CdS, AlN or a ferroelectric material deposited in the form of thin layers. The elongation excitation mode may be used with fairly thin layers of piezoelectric material, so that a compact device can be made. The bending excitation mode requires a greater thickness of piezoelectric material, but nevertheless that lies within the scope of this invention. In the bending mode case, the excitation force imposed by the piezoelectric material on the membrane is directed along the arrow F' shown as a dashed line on FIG. 2, whereas in the case of the excitation elongation mode, the excitation force is the force F represented by a solid line on FIG. 2. More generally, the bending or elongation excitation mode depends on the crystalline orientation and geometry of the piezoelectric material, and particularly its thickness e.

It is also possible to use thick ceramics as piezoelectric material, glued above the mobile membrane as described in H. Goto's publication already mentioned above in the introduction to this application.

Another way of making a membrane deflection means is to make an electrostatic control using facing electrodes. This type of device is illustrated in FIG. 3, in which the numeric references are identical to those in FIG. 2 for the same elements. Reference 30 shows a first electrode on the surface of substrate 12, reference 32 shows a second electrode located under membrane 16 and on substrate 34, which no longer rests directly on the upper surface of substrate 12, but is separated from it by a space 36 obtained by eliminating a layer of material on the substrate surface 12. Application of a given voltage to electrodes 30, 32 can bring them closer or further apart, and produce a corresponding movement of membrane 14, 16. If substrate 12 is a silicon substrate, electrode 30 can be obtained by superficial ionic implantation of boron to form silica, and substrate 34 may be a thin layer of silicon. The solution consisting of making an electrostatic control requires a sequence of technological steps which are undoubtedly a little more complex than in the case of a piezoelectric control, but obviously eliminates the use of this piezoelectric material which is always difficult to make.

The dielectric material membrane may have various shapes. On FIGS. 2 and 3 the membrane actually lies in two planes with an angle α between them greater or strictly greater than 90° when the membrane is at rest.

The reflecting area 20, or part of the reflecting area 20, is located or is deposited on the (mobile) part of the membrane which forms an angle α with the surface 15 of the substrate on which a fixed part of the membrane is formed.

It is obvious that in general a reflector according to the invention can be made by giving the angle α an arbitrary value. However, as we will see later, an angle α such that the part 14 of the membrane is directed along a crystallographic plane of the substrate 12 may be preferred. Ranges of the angle α between 90° and 135°, or 120° and 130°, may be preferred for other reasons.

FIG. 4 shows a membrane without its substrate in perspective, the reference 38 representing means of deflecting the membrane, for example electrostatic means as they were described above in relation to FIG. 3. In the embodiment shown in FIG. 4, the membrane has a constant width along an Oz axis, the only possibility of activation then being in bending about the Oz axis.

Figure 5:
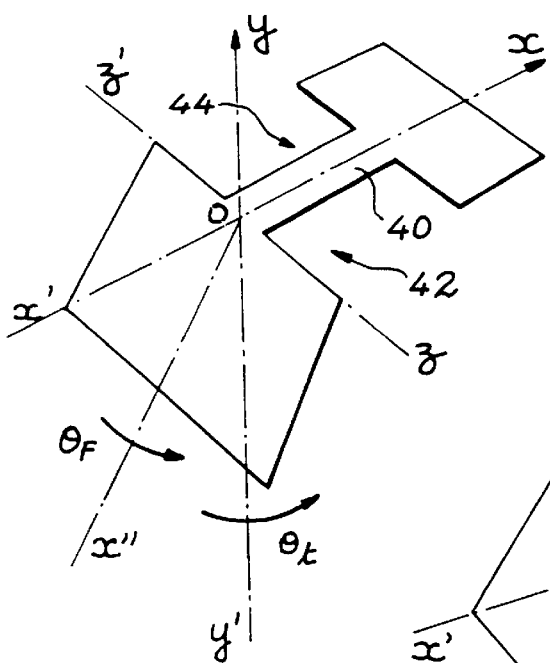

It may also be useful to have a structure capable of driving the mirror not (or not only) in bending about the Oz axis, but also in torsion around the Oy axis, as shown on FIG. 5. On FIG. 5, the central part of the membrane (between the area containing the mirror movement activation means, and the mirror itself) is reduced to a micro-beam 40. This embodiment also has the advantage that it opens up lateral clearances 42, 44 through which the substrate can be attacked when the cavity 18 is being formed (see FIG. 2).

There are also other higher order mechanical vibration modes corresponding to more complex deformations of the beam. However, although these modes do exist regardless of the geometric configuration of the beams, they cannot be efficiently excited unless the symmetry of the spatial distribution of the mechanical force induced by the excitation device used with respect to the beam (piezoelectric or electrostatic) is suitable.

In particular, a beam configuration such as that shown in FIG. 5, together with a single pair of electrodes (or a single piezoelectric crystal) with the same axis of symmetry xx' in the plane of the plate can cause excitation of the bending mode (corresponding to $\theta_f$ on FIG. 5), but is not very well adapted for exciting the torsion mode (corresponding to $\theta_t$). Therefore, it is preferable to adapt the geometry of the device, and particularly the position of the beam and layout of elements in the excitation system, to the mode type to be excited.

Figure 6:
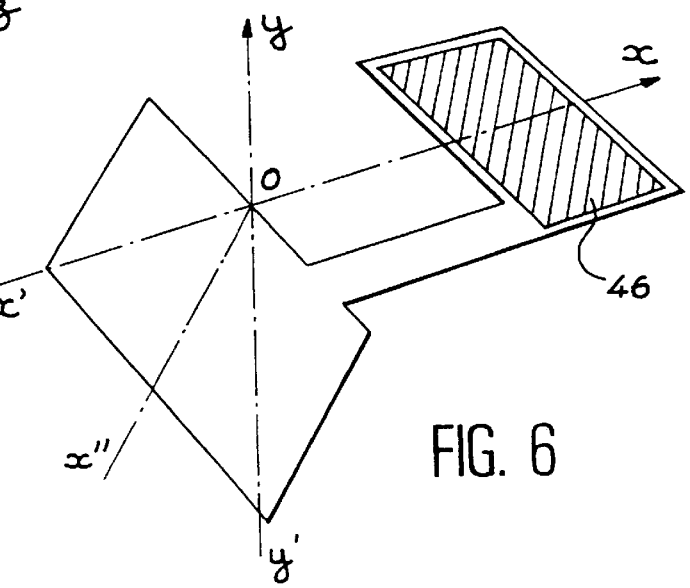

One way of obtaining a good excitation of the bending and the torsion modes may be to use a beam geometry that is not symmetrical with respect to the xx' axis, as shown on FIG. 6, in this case only a single excitation area is necessary and it may be symmetrical about the xx' axis. The configuration in FIG. 6 is asymmetric, but the asymmetry is not very marked. When there are no spatial constraints during manufacture of the device that make it impossible, this asymmetry may be increased as shown on FIG. 7, in which the beam 48 and the mirror 52 are offset by a maximum amount towards the right, in other words in the z' direction, from the xx' axis and the excitation device 50.

Another way of simultaneously exciting the torsion and bending modes is shown on FIG. 8 and consists of using an excitation configuration containing several groups of excitation means (several pairs of electrodes or several piezoelectric crystals), which can use suitable addressing, for example pairs of electrodes or piezoelectric crystals involved, to modify the excitation mode of beam 54. On FIG. 8, two groups of excitation means are shown schematically in the form of two pairs of electrodes 56, 58 for an electrostatic type excitation; the two pairs of electrodes may be addressed in phase and/or in phase opposition, depending on the mechanical vibration mode to be given preference, by the use of usually different excitation frequencies. A similar configuration with three pairs of electrodes 60, 62, 64 can also create the required asymmetry as shown on FIG. 9.

Obviously, other configurations may be imagined and the configurations described above may be combined in order to eliminate the spatial symmetry between the mobile element (mirror and beam) and the excitation areas.

Figure 10:
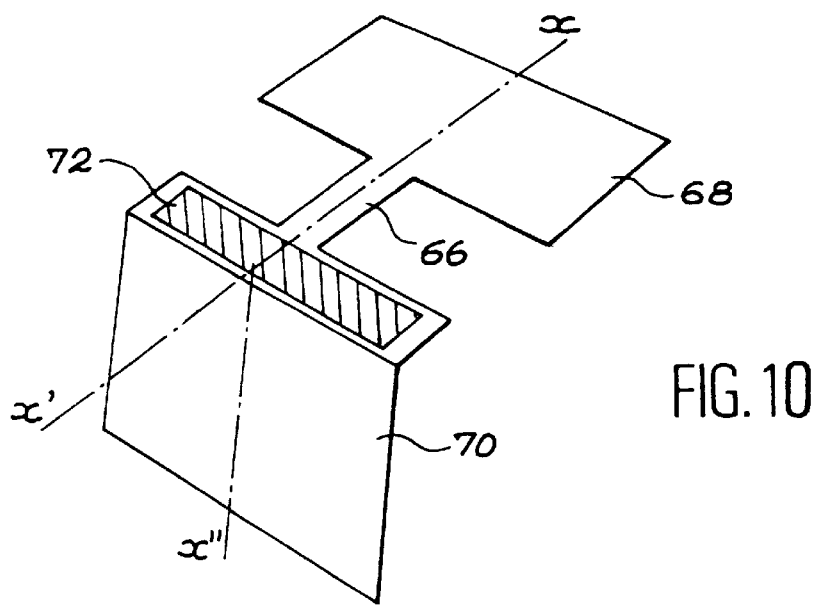

Furthermore, it may be useful in some cases to give priority to the amplitude of one scanning direction with respect to the amplitude of another scanning direction; this is the case for automobile range finding in which horizontal scanning must be of the order to 10° to 20°, whereas vertical scanning of the order of 3° is sufficient. On the other hand, in some other applications, an attempt is made to make scanning angles almost equal in both directions, and therefore to ensure that $\theta_t$ is approximately equal to $\theta_f$. More complex configurations with recesses can also adjust the respective amplitudes of scanning angles and the values of resonant frequencies of vibration modes. Thus on FIG. 10, a beam 66 connects an excitation area 68 to a mirror area 70, the mirror area having a recess 72 formed in its upper part which facilitates the torsion movement. In this case too, this latter embodiment may be combined with the other embodiments described above.

Figure 11:
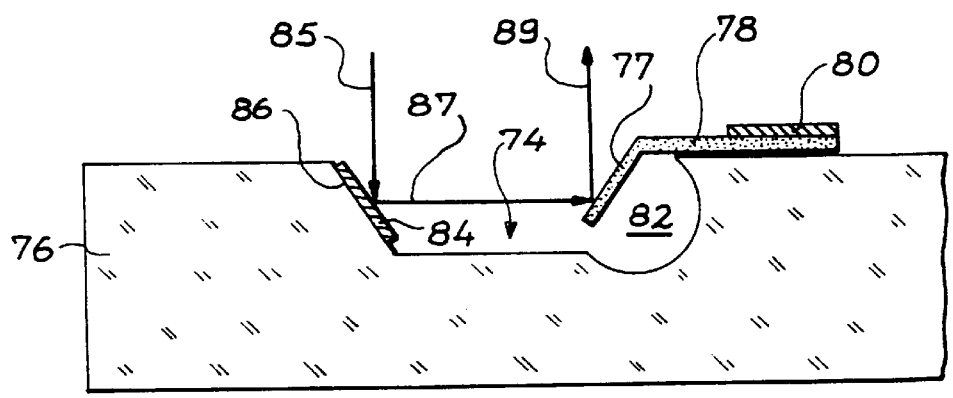
FIGS. 11, 12 and 13 show three examples of a device containing an element according to the invention.

Another embodiment of the invention is shown on FIG. 11. A membrane 78 made of a dielectric material with its activating element 80, are deposited on a substrate 76. In accordance with the invention, part of the membrane with a reflecting area 77 may be deflected above a cavity 82 formed in the substrate 76. Furthermore, another surface opening 74 in substrate 76 is formed in this substrate. A reflecting area, for example a fixed micromirror 84, may be formed on a wall 86 of this opening, for example in order to reflect an incident or incoming beam 85 along a direction 87 in the direction of the reflecting area 77 of the membrane. This reflecting area will reflect beam 87 along a direction 89 (outgoing beam), the stretched bending or torsion movements of the membrane varying the direction of the outgoing beam 89.

Figure 12:
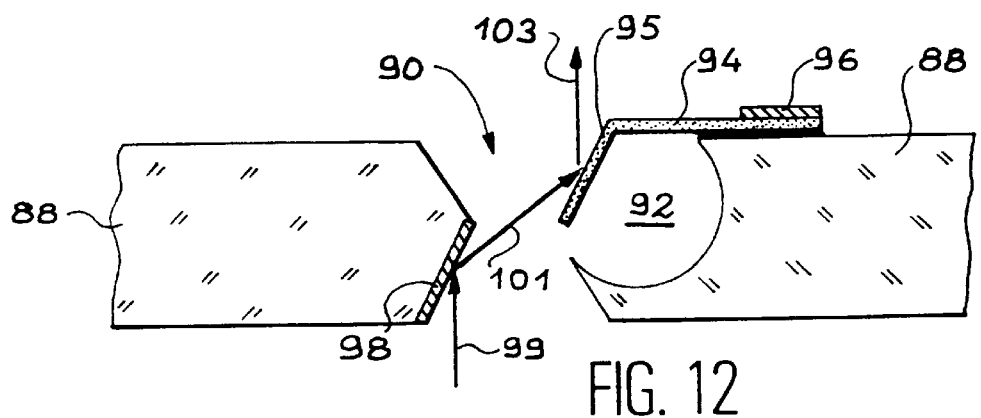

According to one alternative shown on FIG. 12, a through hole 90 is formed in the substrate 88. A membrane, its excitation element and the cavity are denoted by references 94, 96 and 92 respectively. A reflecting surface may be formed on one wall of opening 90, in an area lower than the area in which membrane 94 is deposited, for example using a fixed micromirror 98. This micromirror may be laid out such that an incoming beam 99 is reflected in the form of a beam 101 to membrane 94, the reflecting surface of membrane causing a second deviation to form an outgoing beam 103. With this configuration, the angle between the incoming beam 99 and the outgoing beam 103 is close to 180°, and in any case is greater than 90°, which is not the case in configuration shown on FIG. 11 in which the angle between the incoming and the outgoing beams is close to 0°. An outgoing beam 103 parallel to the incoming beam 99 may be obtained depending on the orientation of the reflecting area 98, and for some incident beams 99. Preferably, the reflecting area 95 of the membrane and the reflecting area 98 lie in two parallel or approximately parallel planes, for example when the membrane 94 is at rest. In the case of a silicon substrate 88, this result may be obtained by choosing to put these two planes in a crystallographic plane (1,1,1 or 1,-1,1 plane).

With the device in FIG. 12, the direction of the outgoing beam is approximately identical, or in any case is very similar to the direction of the incident beam. In devices with a single mirror, this condition may only be obtained if the incident beam is almost parallel to the surface, which causes difficult geometry and alignment problems.

Figure 13:
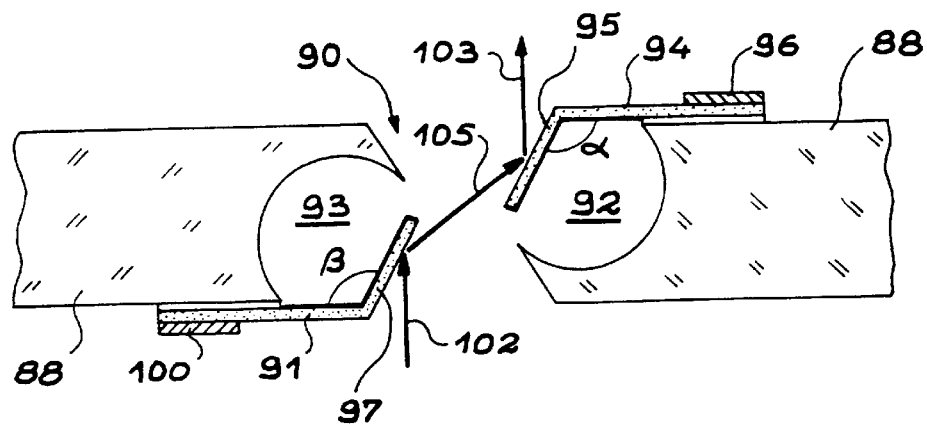

Another alternative is illustrated on FIG. 13. This can also give a direction of the outgoing beam 103 approximately identical to, or in any case very similar to, the direction of the incident beam 102. It uses two scanning micro-elements according to the invention, each made on a surface of a substrate, the two micro-elements being placed "head to foot". Here again, a through hole 90 is formed in the substrate 88, or separates the two scanning micro-elements. A first element comprises a membrane 94 and its excitation element 96 above a cavity 92. A second micro-element is formed on another substrate surface 88 which comprises a second cavity 93. This micro-element comprises essentially a membrane 97, and excitation means 100 (of the piezoelectric or electrostatic type as already described above). As with membrane 94, membrane 97 defines two planes with a non-zero angle β between them, preferably greater than 90°, for example between 90° and 135° or between 120° and 130°. As for the first micro-element, the mobile part of the second membrane 97 may be deflected along at least one direction "above" (actually below on FIG. 13), or with respect to, the cavity 93 formed in the substrate 88.

According to one alternative not shown on the figures, a component comprises two scanning micro-elements made on the same side of the substrate (same relative configuration of the two mirrors as shown in FIG. 11).

In both cases, the first membrane may use one of the structures described above, for example in relation to FIGS. 5 to 10, whereas the second membrane may also have any one of the structures mentioned above, particularly in relation to FIGS. 5 to 10. Each membrane may be moved in bending about the Oz axis (see notation on FIG. 5), or in torsion about the Oy axis. Similarly, one of the membrane may be activated by piezoelectric means, whereas the other membrane is activated by electrostatic means. This type of device can amplify the maximum angular range, since the membranes may deflect sequentially or equally simultaneously.

According to a specific embodiment, one of the two mirrors may create a deflection along one direction (for example with a control frequency $f_1$), whereas the second mirror will create a deflection in the other direction (control frequency $f_2$), the geometry of the control means for each mirror obviously being adapted to this operating mode.

Therefore in the case shown in FIG. 13, there are two deflecting areas, the first and second reflecting areas being laid out so that a light beam, referred to as the incoming beam, from a given direction, is subjected to a first reflection on one of the two reflecting areas, and a second reflection on the other reflecting area to form an outgoing beam. The two reflecting areas formed on the mobile ends of the membranes may be oriented along the same crystallographic plane in the substrate. They may define two parallel or approximately parallel planes when the mobile part of each membrane containing a reflecting area is in the at-rest position; for example the two planes may be parallel to a given crystallographic plane in the substrate.

All structures described above are compatible with collective manufacturing methods used in microelectronics.

We will now describe a process of making a device according to the invention.

In general, a process for making a scanning microelement according to the invention comprises:

a deposition step, in which a membrane made of a dielectric material is deposited on a substrate surface, a step in which a cavity is formed in the substrate, and part of the membrane which forms a reflecting surface may be deflected along at least one direction above this cavity, a step in which means are formed to force a deflection onto this part of the membrane along at least one direction.

The cavity may be formed by reactive microwave ionic attack.

The cavity may be located at the edge of a surface opening in the substrate on which the membrane is deposited, or may be a through hole.

For example, this opening may be made by preferential chemical etching. Surfaces parallel to crystallographic planes can thus be formed.

The membrane may possibly be etched to make openings in it.

Other steps, particularly for making means of applying a deflection to the membrane, are described below.

We will now give a detailed example of how to make a device in accordance with that shown in FIG. 12, but the expert in the field will be capable of adapting the various steps to obtain embodiments, for example conform with the embodiments in FIG. 2 or 11 or 13. Furthermore, we will use the example of a silicon substrate and a silica membrane, but here again the expert in the field will be capable of adapting the various steps to different natures of substrates and elements.

Figure 14:
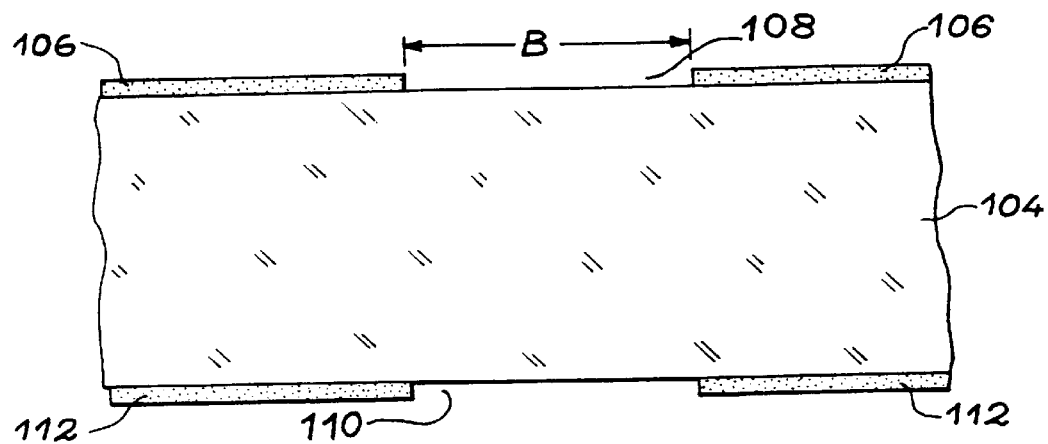
FIGS. 14 to 21C show the steps in the manufacture of microelements according to the invention, FIG. 22 schematically shows two reflecting surfaces in a device according to the invention.

In the first step illustrated on FIG. 14, a double sided mask of a silicon substrate 104 is formed. For example masks 106, 112 may be used made of silica deposited by CVD. For example, this mask may follow the line of the 1,1,1 plane on the 1,0,0 surface plane of the silicon substrate. The masks contain openings 108 and 110 respectively, for which the dimensions A (along a direction perpendicular to the plane of FIG. 14) and B (see FIG. 14) depend on the required geometry. In practice if we use silicon plates with a thickness of the order of 500 µm, A can be chosen to be of the order of 500 to 1500 µm as a function of the cross-section of the light beam to be deflected. The dimensions of B may be of the same order. Obviously, it is always possible to choose thicker silicon plates (1 to 2 mm) and to increase the dimensions. Furthermore, openings 108 and 110 do not necessarily have the same dimensions.

In the second step, a preferential chemical etching of the silicon (two sides) is done, to form an opening 114 which passes through the substrate 104.

This method of etching depends on the difference in the etching speed on different crystallographic planes in the same material for some attack agents.

In general, the attack speed is very slow along one of the crystalline planes (for example (111) type planes) and is very fast along others.

Therefore, particular etching geometries are obtained depending on this property, with a shape imposed by the angular configurations of the slow attack planes and the initial orientation of the crystals.

This procedure can be applied to silicon, for which the properties in this respect are well known. But very similar configurations can be obtained with other materials such as germanium or with compound semi-conductors such as GaAs or InP or others. In the latter case, allowance has to be made for the fact that there are two types of atomic planes.

Figure 15:
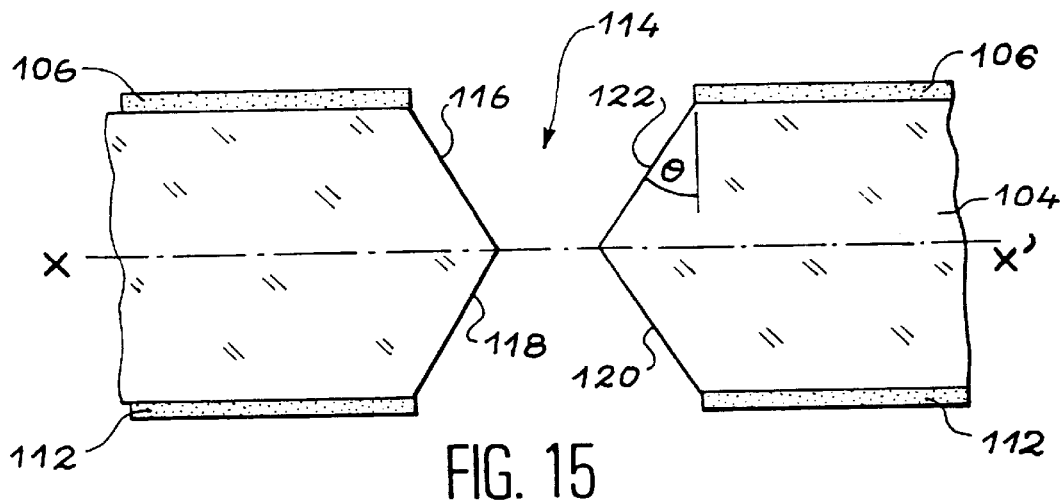
Figure 16:
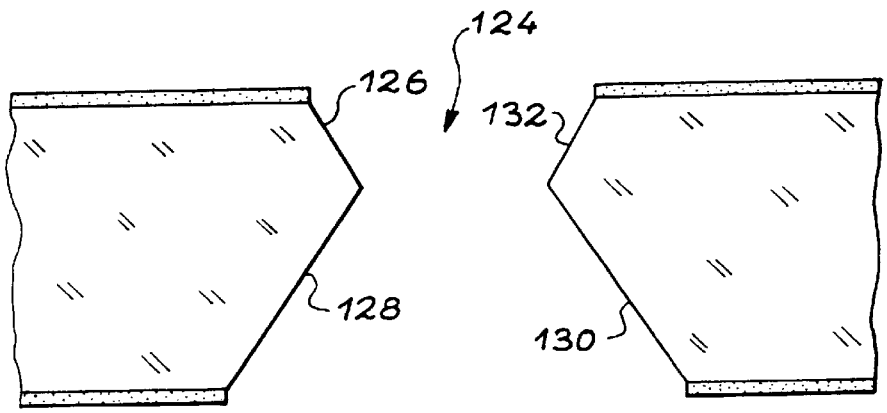

Therefore preferential attack can form surfaces 116, 118, 120, 122 oriented along the crystallographic planes, such as the 1,1,1 or 1,–1,1 planes. These planes then form an angle θ of about 36° with the vertical. The structure shown on FIG. 15 is symmetric about a median plane contained in the silicon slice 104, the line of which is shown as the xx' axis on FIG. 15. It is possible and sometimes preferable to form an asymmetric structure, for example by modifying the dimensions of mask openings. This type of structure is illustrated in FIG. 16, in which the lower part of opening 124 includes surfaces 128, 130 extending over a larger distance than surfaces 126, 132 in the upper part.

Figure 17:
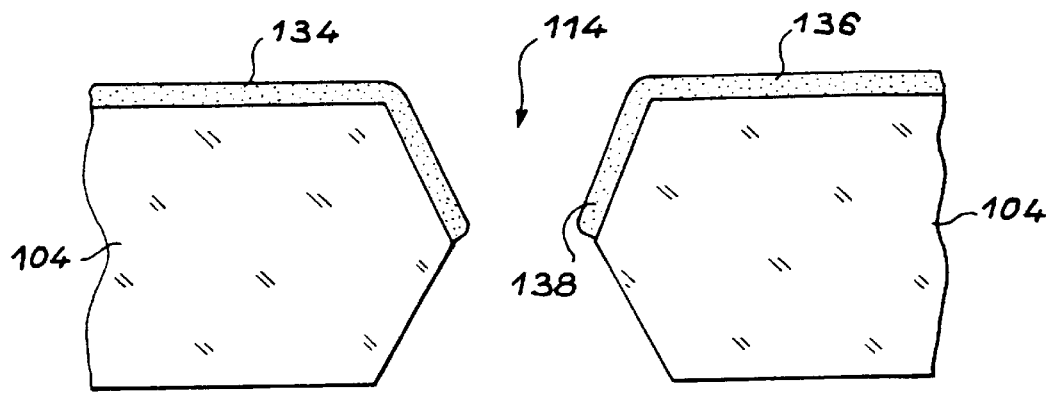

In a third step, masks are eliminated and, as shown on FIG. 17, a deposit of thick silica layer 134, 136 is formed, for example by PECVD. This silica layer will form the body of the mobile membrane. The deposit is made only on the upper face of substrate 104. Obviously, its thickness depends on the required stiffness. In practice, 4 to 40 µm thick layers are used.

Figure 18:
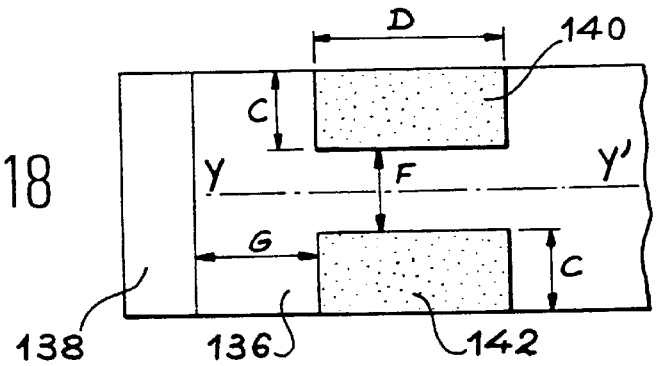

This silica layer may be etched in a fourth step. FIG. 18 shows a top view of the silica layer 136, the reference 138 denoting the part of the layer deposited on the inclined wall of opening 114. This step leads to the formation of openings 140, 142 which make it possible to:

etch substrate 104 later on, in order to open a cavity under the membrane and to partially release it, define a beam connecting the mobile part of the membrane to the control area for movements of this membrane (such as beams 40, 48, 54 on FIGS. 5, 7, 8).

FIG. 18 shows openings symmetric about a plane perpendicular to the silicon substrate, and the line of which is shown as the YY' axis on FIG. 18. These openings can be made in any arbitrary shape. Similarly dimensions, such as dimensions C, D, F, G (see FIG. 18) may be defined arbitrarily. In practice these dimensions are of the order of a hundred or several hundreds of micrometers. Masks used for etching layer 136 may be simple metal masks placed on this layer.

A fifth step will describe the formation of a cavity 144 in substrate 104 (see FIG. 19) by isotropic etching of silicon from openings 140, 142 formed in the silica layer 136. The technique used is preferably reactive microwave ionic attack, for example using $SF_6$. This type of ionic attack is highly selective between the silicon and the silica. Therefore membrane 138, 136 may be separated from the silica substrate 104, without any significant effect on the silica layer 136, 138 forming this membrane. In practice, since the thicknesses of etched silicon are of the order of 300 μm (slightly greater than half the thickness of the silicon plates) and the selectivity exceeds 100, the silica layer is only very slightly affected by the etching (which is only about 2 to 3 μm thick). The etching geometries obtained from openings 140, 142 formed in the silica mask are known approximately whenever the dimensions of these openings exceed about a hundred microns. As a first approximation, it may be assumed that the attack depth d(t) is equal to the product of the attack speed by the etching time, and is approximately the same in all etching directions, starting from the edges of openings 140, 142.

Figure 19:
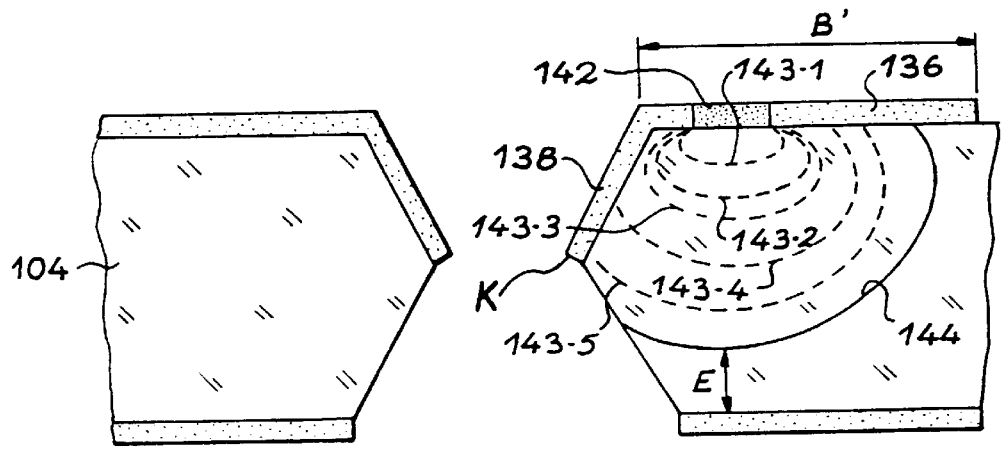

On FIG. 19 the dashed lines 143-1, . . . 143-5 represent the variation of the attack area at different times $t_1$, $t_2$, $t_3$, $t_4$, $t_5$. For a complete separation of area 138 from substrate 136, the attack front must reach at least point K which marks the lower limit of area 138. In general overetching occurs close to the surface plane. This overetching is not a problem taking account of the fact that the silica acts as a stopping layer (selectivity effect between the silica and the silicon). The thickness E of the silicon remaining at the bottom of the substrate will be relatively small, usually less than half the thickness of the substrate. In order to increase the mechanical strength of the substrate, and therefore of the entire device, it may be useful to use an asymmetric geometry, such as that shown in FIG. 16, which makes it possible to keep larger values of E.

If the device controlling the membrane movement is of the piezoelectric type, the next step (FIG. 20) is to deposit and etch the lower electrode 146, the piezoelectric material 148 and the upper electrode 150.

A layer 152, 154, 156, 158 of a material can then be deposited in order to increase the reflectivity of the mirrors, for example a metal deposit (Ti, Au, Al, Pt, Cr) or a multi-layer dielectric deposit ($SiO_2$—$TiO_2$). This step of depositing a reflecting layer may possibly be carried out at the same time as the step in which electrodes 146, 150 are deposited, if the metallic deposits concerned are identical.

Figure 20:
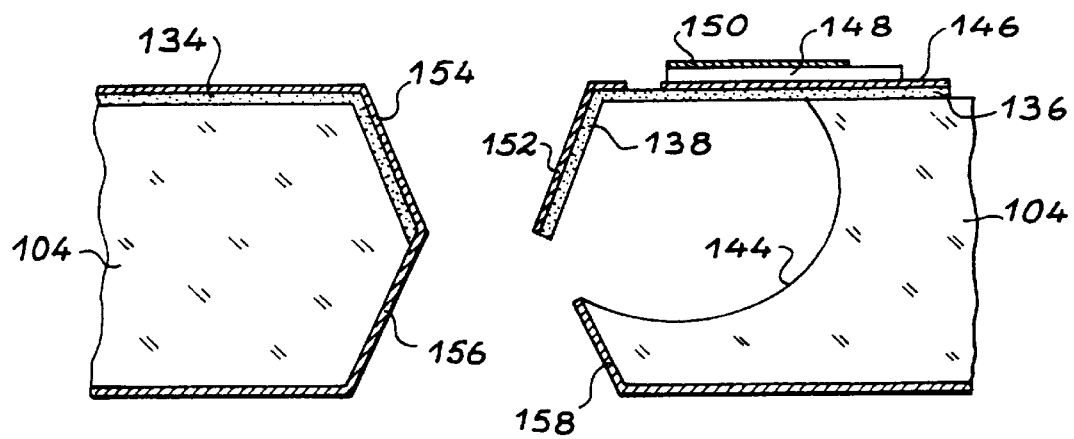

The structure obtained finally is shown in FIG. 20. The membrane 138 is separated from the silicon substrate, but a lateral desolidarization step has to be carried out. This may be done by sawing through the entire thickness of the substrate; in this case the microscanning elements are individualized and collective treatment is stopped at this step. Lateral desolidarization may also be done by lateral sawing over a thickness slightly greater than half of the silicon plate, for example before assembling a plate containing microscanning elements with other plates of the device to be made, the devices being individualized after assembly. Taking account of the fragility of the membranes, it may be better to make the structures more rigid before sawing using a hardening resin which may be subsequently dissolved.

The steps described above are suitable for manufacture of a device with a piezoelectric actuation means. Some of the steps for a device with an actuator using an electrostatic force described above are identical, particularly the steps for making double mirrors and the mobile membrane. The main difference is due to manufacture of the electrostatic control before depositing the silica layer 136.

Preferably, the support structure used to make the electrostatic control will be a SIMOX structure obtained by oxygen implantation followed by appropriate annealing, in order to form a buried insulating silicon layer. The advantage of this structure for an electrostatic control is that it can form a very thin (of the order of 0.2 to 0.3 μm) and very uniform interelectrode spacing by localized ablation of the buried silica layer. One of the advantages of this is that it minimizes the control voltages necessary for mechanical excitation of the membrane on which the mobile mirror is supported. As in the previous steps, and taking account of the large dimensions involved (of the order of 100 μm to 1 mm) and the more critical nature of the positioning, masks usable for the formation of electrodes may be obtained by conventional lithographic techniques, or using mechanical masks.

Figure 21A:
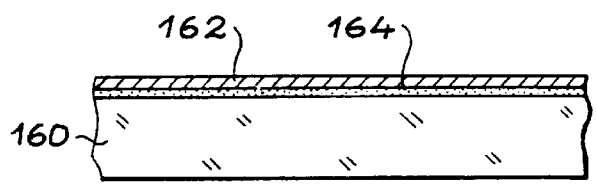
Figure 21B:
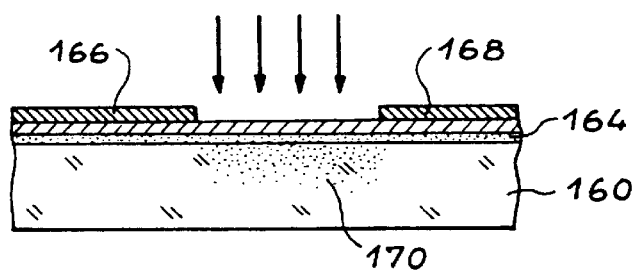

Therefore, we start from a SIMOX structure such as that shown on FIG. 21A, in which the reference 160 denotes a silicon substrate, reference 162 denotes the upper surface of the substrate, the buried silica layer being denoted as reference 164. The mask 166, 168 is then deposited on surface 162 (FIG. 21B). The lower electrode is then made by doping the silicon support. For example, this doping may be done by implantation of strong doses of boron in the areas concerned, with an energy such that the doping 170 obtained is located just below the buried layer of silica 164.

Figure 21C:
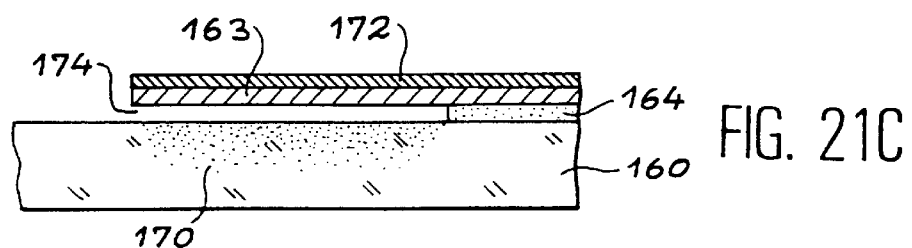

We then locally dissolve the buried silica layer. This dissolution is done by chemical attack (for example using a traditional attack source based on hydrofluoric acid) through one or several openings formed in the surface silicon layer 162. After localized dissolution of the silica layer, the openings may be blocked by a covering layer (not shown) (for example $Si_3N_4$ obtained by CVD) . The masks, the silicon surface layer and the buried silica layer in areas complementary to control areas, are then eliminated. Metallic deposits make contacts for the lower and upper electrodes. Therefore, the structure of local control areas located as shown on FIG. 21C are obtained, the doping area 170 forming the lower electrode and the surface silica layer 163 separated from this doping area by an interstice 174 acting as a support for the upper electrode 172. Contacts are not shown on this figure.

After making these control electrodes, the steps already described above (formation of the silicon membrane, formation of the cavity by preferential chemical etching of the silicon) may be repeated, together with the step of depositing and etching the reflecting layers. Finally, the structure obtained for the part of the device containing the membrane and the control electrodes is similar to that shown on FIG. 3.

The manufacturing process that can be used in the case of a structure similar to the structure described above in relation to FIG. 13, is a derivative of the process described above; this process is a "single sided" process in the sense that a "mobile" membrane that can be deflected along at least one direction above a cavity formed in the substrate, is only made on one side of this substrate. A "double sided" process can also be used in order to produce the device shown in FIG. 13. In this case, the steps described above in relation to FIGS. 14, 15 and 16 are the same. Then thick silica layers may be deposited, for example by PECVD, on both sides of the substrate, these silica layers forming the bodies of mobile membranes. Here again, the thickness of the layers depends on the required stiffness, 4 to 40 μm thick layers being used in practice.

These silica layers may then be etched (step similar to the step shown in FIG. 18). This etching step leads to the formation of openings in each membrane, which will enable:

subsequently attacking the substrate on each side, in order to form a cavity under each membrane and to partially release it, and for each membrane, defining a beam connecting the mobile part of the membrane to the movement control area for this membrane.

The substrate is then etched starting from openings formed in the silica layers. The etching technique was described above, in relation to FIG. 19.

Piezoelectric actuation devices can then be made, the material can be deposited in order to increase the reflectivity of the mirrors (see example given above), and to form lateral separation, for example by sawing through the entire thickness of the substrate.

When making piezoelectric actuation means, the steps in the process described above in relation to FIGS. 21A–21C are also suitable.

A device such as that described above in relation to FIG. 13 may also be made using two independent scanning micro-elements each with a membrane formed on a substrate above a cavity, such as that described in relation to FIGS. 2 and 3, and the two components can be assembled "head to foot". In this case, a single sided process is sufficient, but an additional high precision step is necessary to assemble the two components with respect to each other.

Figure 23:
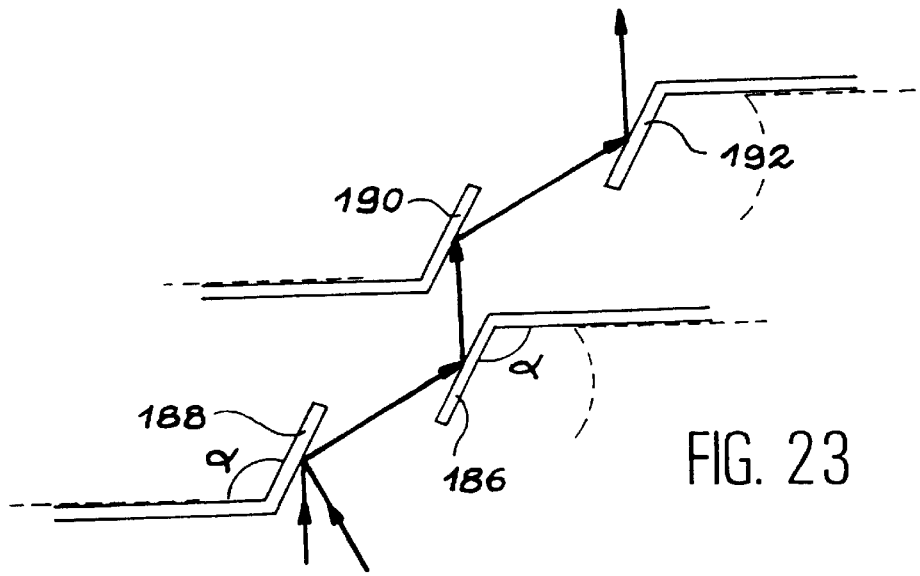
FIG. 23 shows a cascade of two components according to the invention.

Therefore, the invention can be used to make a scanning micro-element, which can then be used in the manufacture of a micro-optic component used to deflect a beam "forwards"; the direction of the outgoing beam is more or less the same as, or in any case is very similar to, the direction of the incident beam. Thus a number of components made in this way may be assembled in cascade. An assembly of two components in cascade is shown diagrammatically in FIG. 23. The surfaces of the two substrates are symbolized by dashed lines.

An incoming beam meets a first mirror 188 and is deviated towards a second mirror 186; a second component leaves the first component towards a first mirror 190 which deviates it by reflection to a second mirror 192 in the second component. Each component may be any one of the types described above, for example in relation to FIGS. 12 or 13. It is thus possible to assemble components according to the invention in series or in cascade with N>2 (N=3, 4, . . . , etc.).

In some cases, it is useful if the direction of the outgoing beam is the same as the direction of the incident beam; in particular, this condition is achieved for a pair of parallel, or almost parallel mirrors, as in the case described above in relation to FIG. 12.

The angle $\alpha$ between the plane of the substrate(s) and each mirror is then chosen to give a value compatible with the required function and practical use of the device.

Figure 22:
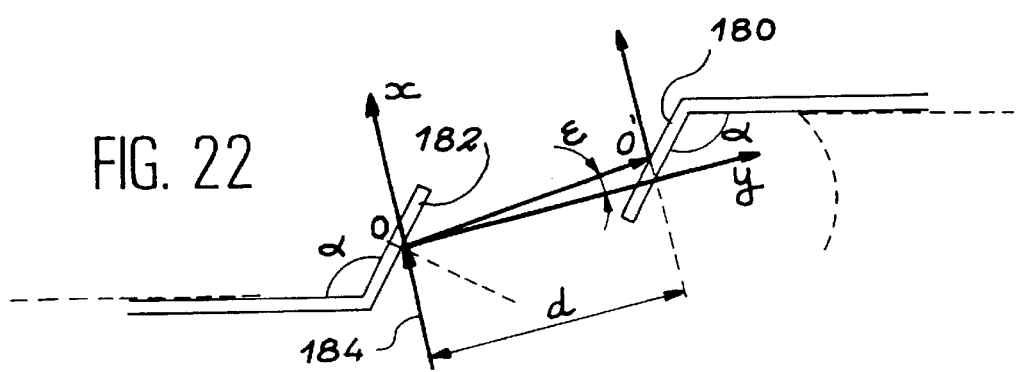

FIG. 22 diagrammatically shows two reflecting surfaces 180, 182, each forming an angle $\alpha$ with one of the surfaces of the substrate. (These surfaces are shown diagrammatically by dashed lines). An incident beam 184 meets the reflecting surface 182 at point O, and is reflected towards the reflecting surface 180 that it meets at point O'. A coordinate system Oxy is defined by the incident beam 184. The beam reflected by the surface 182 forms an angle $\epsilon$ with the Oy axis. Choosing an angle $\epsilon$ strictly greater than zero and less than 90° is equivalent to choosing an angle $\alpha$ between 90° and 135°.

The value d represents the distance between two mirrors 180, 182. If this distance is to be not too large compared with the dimensions of these mirrors (which are typically of the order of 1 to 2 mm) without changing the proposed embodiment (by preferential chemical attack), it is necessary that:

d tan($\epsilon$)≈200–500 $\mu$m hence: 10°<$\epsilon$<30°.
Since also $$\epsilon = 3\frac{\Pi}{2} - 2\alpha,$$

we obtain:
120°<$\alpha$<130°.

In one of the example configurations proposed above, $\alpha$ is approximately equal to 125° (angle between the silicon crystal planes (1,1,1) and (1,0,0)); this value satisfies the above criteria.

We claim:

1. Micro-optical device, comprising:
   a substrate,
   a first membrane made of a dielectric material deposited on a first surface of the substrate, the membrane defining two planes forming a non-zero angle $\alpha$ between them, part of the membrane including a first reflecting area and capable of being deflected along at least one direction relative to a first cavity formed in the substrate,
   first means to apply a deflection to this part of the first membrane, along at least this direction,
   a second membrane made of a dielectric material deposited on a second surface of the substrate, the membrane defining two planes forming a non-zero angle $\beta$ between them, part of the membrane including a second reflecting area and capable of being deflected along at least one direction relative to a second cavity formed in the substrate,
   second means to apply a deflection to this part of the second membrane, along at least this direction.

2. Micro-optical device according to claim 1, the first and second substrate surfaces being located on the same side of the substrate, the two cavities being located at the edge of a surface opening on this side of the substrate.

3. Micro-optical device according to claim 1, the first and second substrate surfaces being located on opposite sides of the substrate, the cavities being located at the edge of a through opening passing through the substrate.

4. Micro-optical device according to one of claims 1 to 3, the angles $\alpha$ and $\beta$ being between 90° and 135°.

5. Device according to one of claims 1 to 3, the angles $\alpha$ and $\beta$ being between 120° and 130°.

6. Device according to one of claims 1 to 3, the part of one of the membrane which can be deflected along one direction can also be deflected along at least one other direction with respect to the cavity.

7. Device according to claim 6, the amplitude along one of the deflection directions being greater than the amplitude along one of the other deflection directions.

8. Device according to one of claims 1 to 3, the part of one and/or the other membrane that can be deflected being connected through a micro-beam to a fixed part that supports means of applying a deflection to the mobile part.

9. Device according to claim 8, the fixed part presenting an axis of symmetry with respect to which the micro-beam is parallel.

10. Device according to claim 9, the micro-beam being offset from this axis.

11. Device according to claim 9, the mobile part being offset laterally with respect to the axis of symmetry of the fixed part.

12. Device according to claim 9, the means of applying a deflection to the mobile part including several groups of means for applying a deflection, distributed on each side of the axis of symmetry.

13. Device according to one of claims 1 to 3, the first and second means of applying a deflection being of the piezoelectric type or electrostatic type.

14. Micro-optical device comprising two micro-devices, each according to one of claims 1 to 3 laid out in cascade, the outgoing beam from one of micro-devices being an incoming beam for the other micro-device.

15. A scanning micro-element comprising:
   a substrate;
   a membrane made of a dielectric material deposited on a substrate surface, the membrane defining two planes making a non-zero angle between them, part of the membrane including a reflecting area and capable of being deflected along at least a first direction above a cavity formed in the substrate; and
   means for deflecting the part of the membrane along at least one direction;
   wherein the part of the membrane that can be deflected being connected through a micro-beam to a fixed part which supports means of applying a deflection to the mobile part;
   the fixed part including an axis of symmetry to which the micro-beam is parallel; and
   the microbeam being offset with respect to the axis.

16. A micro-element according to claim 15, comprising the angle being between 90° and 135°.

17. A micro-element according to claim 15, comprising the angle being between 120° and 130°.

18. A micro-element according to claim 15, comprising means for deflecting the part of the membrane along at least a first direction, and for deflecting it along at least a second direction above the cavity.

19. A micro-element according to claim 18, comprising the amplitude along one of the deflection directions being greater than the amplitude along one of the other deflection directions.

20. A micro-element according to claim 15, comprising the mobile part being offset laterally with respect to the axis of symmetry of the fixed part.

21. A micro-element according to claim 15, comprising the means of applying a deflection to the mobile part including several groups of means of applying a deflection distributed on each side of the axis of symmetry.

22. A micro-element according to claim 15, comprising the means for deflecting being one of the piezoelectric type and the electrostatic type.

23. A micro-element according to claim 15, comprising the cavity being located at the edge of a surface opening in the substrate on which the membrane is deposited.

24. A micro-element according to claim 23, comprising a second reflecting area being formed by or on a surface opening or a surface of the through opening formed in the substrate.

25. A scanning micro-element comprising:
   a substrate;
   a membrane made of a dielectric material deposited on a substrate surface, the membrane defining two planes making a non-zero angle between them, part of the membrane including a reflecting area and capable of being deflected along at least a first direction above a cavity formed in the substrate; and
   means for deflecting the part of the membrane along at least one direction;
   wherein the part of the membrane to which a deflection is to be applied being oriented along a crystallographic plane of the substrate.

26. A micro-element according to claim 25, comprising the angle being between 90° and 135°.

27. A micro-element according to claim 25, comprising the angle being between 120° and 130°.

28. A micro-element according to claim 25, comprising means for deflecting the part of the membrane along at least a first direction, and for deflecting it along at least a second direction above the cavity.

29. A micro-element according to claim 28, comprising the amplitude along one of the deflection directions being greater than the amplitude along one of the other deflection directions.

30. A micro-element according to claim 25, comprising the means for deflecting being one of the piezoelectric type and the electrostatic type.

31. A micro-element according to claim 25, comprising the cavity being located at the edge of a surface opening in the substrate on which the membrane is deposited.

32. A micro-element according to claim 31, comprising a second reflecting area being formed by or on a surface opening or a surface of the through opening formed in the substrate.

33. A scanning micro-element comprising:
   a substrate;
   a membrane made of a dielectric material deposited on a substrate surface, the membrane defining two planes making a non-zero angle between them, part of the membrane including a reflecting area and capable of being deflected along at least a first direction above a cavity formed in the substrate; and
   means for deflecting the part of the membrane along at least one direction;
   wherein the cavity is located at the edge of a surface opening in the substrate on which the membrane is deposited; and
   the opening is a through opening passing through the substrate.

34. A micro-element according to claim 33, comprising the angle being between 90° and 135°.

35. A micro-element according to claim 33, comprising the angle being between 120° and 130°.

36. A micro-element according to claim 33, comprising means for deflecting the part of the membrane along at least a first direction, and for deflecting it along at least a second direction above the cavity.

37. A micro-element according to claim 36, comprising the amplitude along one of the deflection directions being greater than the amplitude along one of the other deflection directions.

38. A micro-element according to claim 33, comprising the means for deflecting being one of the piezoelectric type and the electrostatic type.

39. A micro-element according to claim 33, comprising a second reflecting area being formed by or on a surface opening or a surface of the through opening formed in the substrate.

40. A micro-optical device comprising:
   a substrate;
   a membrane made of a dielectric material deposited on a substrate surface, the membrane defining two planes making a non-zero angle between them, part of the membrane including a reflecting area and capable of being deflected along at least a first direction above a cavity formed in the substrate;
   means for deflecting the part of the membrane along at least one direction; and a second reflecting area laid out on the substrate so as to reflect a light beam from a given direction towards the reflecting area of the membrane, the light beam then being subjected to two successive reflections to form an outgoing beam.

41. A device according to claim 40, comprising the angle being between 90° and 135°.

42. A device according to claim 40, comprising the angle being between 120° and 130°.

43. A device according to claim 40, comprising means for deflecting the part of the membrane along at least a first direction, and for deflecting it along at least a second direction above the cavity.

44. A device according to claim 43, comprising the amplitude along one of the deflection directions being greater than the amplitude along one of the other deflection directions.

45. A device according to claim 40, comprising the means for deflecting being one of the piezoelectric type and the electrostatic type.

46. A device according to claim 40, comprising the cavity being located at the edge of a surface opening in the substrate on which the membrane is deposited.

47. A device according to claim 40, comprising the second reflecting area being formed by or on a surface opening or a surface of the through opening formed in the substrate.

48. A device according to claim 40, comprising the second reflecting area being laid out such that an angle between the light beam and the outgoing beam exceeds 90°.

49. A device according to claim 40, comprising the two reflecting areas defining two approximately parallel planes when the part of the membrane with a reflecting area is in at the at-rest position.

50. A device according to claim 49, comprising the two planes being parallel to a crystallographic plane in the substrate.

51. A scanning micro-element comprising:

a substrate;

a membrane made of a dielectric material deposited on a substrate surface, the membrane defining two planes making a non-zero angle between them, part of the membrane including a reflecting area and capable of being deflected along at least a first direction above a cavity formed in the substrate; and means for deflecting the part of the membrane along at least one direction;

wherein the part of the membrane that can be deflected is connected through a micro-beam to a fixed part which supports means of applying a deflection to the mobile part.

52. A micro-element according to claim 51, comprising the angle being between 90° and 135°.

53. A micro-element according to claim 51, comprising the angle being between 120° and 130°.

54. A micro-element according to claim 51, comprising means for deflecting the part of the membrane along at least a first direction, and for deflecting it along at least a second direction above the cavity.

55. A micro-element according to claim 54, comprising the amplitude along one of the deflection directions being greater than the amplitude along one of the other deflection directions.

56. A micro-element according to claim 51, comprising the fixed part including an axis of symmetry to which the micro-beam is parallel.

57. A micro-element according to claim 56, comprising the microbeam being offset with respect to this axis.

58. A micro-element according to claim 51, comprising the mobile part being offset laterally with respect to the axis of symmetry of the fixed part.

59. A micro-element according to claim 51, comprising the means of applying a deflection to the mobile part including several groups of means of applying a deflection distributed on each side of the axis of symmetry.

60. A micro-element according to claim 51, comprising the means for deflecting being one of the piezoelectric type and the electrostatic type.

61. A micro-element according to claim 51, comprising the cavity being located at the edge of a surface opening in the substrate on which the membrane is deposited.

62. A micro-element according to claim 61, comprising a second reflecting area being formed by or on a surface opening or a surface of the through opening formed in the substrate.

* * * * *